(12) United States Patent
Nagabhushana et al.

(10) Patent No.: US 7,788,414 B2
(45) Date of Patent: Aug. 31, 2010

(54) MEMORY CONTROLLER AND METHOD OF CONTROLLING A MEMORY

(75) Inventors: Rashmi H. Nagabhushana, Bangalore (IN); Ravi Ranjan Kumar, Bangalore (IN); Prashant Balakrishnan, Bangalore (IN)

(73) Assignee: Lantiq Deutschland GmbH, Neubiberg (DE)

( * ) Notice: Subject to any disclaimer, the term of this patent is extended or adjusted under 35 U.S.C. 154(b) by 289 days.

(21) Appl. No.: 11/623,638

(22) Filed: Jan. 16, 2007

(65) Prior Publication Data

US 2008/0172534 A1 Jul. 17, 2008

(51) Int. Cl.
*G06F 3/00* (2006.01)
(52) U.S. Cl. .................. 710/5; 710/6; 710/14
(58) Field of Classification Search .......... 710/5, 710/6, 14
See application file for complete search history.

(56) References Cited

U.S. PATENT DOCUMENTS

| | | | |
|---|---|---|---|
| 5,483,646 A * | 1/1996 | Uchikoga .................. 711/100 |
| 5,487,173 A * | 1/1996 | Greiss et al. .................. 712/35 |
| 5,596,760 A * | 1/1997 | Ueda .......................... 712/241 |
| 5,694,585 A | 12/1997 | Dwin et al. |
| 5,953,243 A * | 9/1999 | Capps et al. .................. 365/52 |
| 6,108,719 A * | 8/2000 | Klein .......................... 710/10 |
| 6,763,443 B1 * | 7/2004 | Clark et al. .................. 711/167 |
| 7,375,833 B2 * | 5/2008 | Miyata ....................... 358/1.13 |
| 7,490,204 B2 * | 2/2009 | Bellows et al. .............. 711/154 |
| 2003/0095464 A1 | 5/2003 | Huang |
| 2005/0144372 A1 * | 6/2005 | Walker ....................... 711/105 |
| 2005/0262323 A1 * | 11/2005 | Woo et al. .................... 711/167 |
| 2007/0180155 A1 * | 8/2007 | Irish .............................. 710/5 |

OTHER PUBLICATIONS

JEDEC Solid State Technology Association, "JEDEC Standard, DDR2 SDRAM Specification," JESD79-2A (Revision of JESD79-2), pp. i-74 (Jan. 2004).

* cited by examiner

*Primary Examiner*—Niketa I Patel
*Assistant Examiner*—Farley J Abad
(74) *Attorney, Agent, or Firm*—Dicke, Billig & Czaja, PLLC

(57) ABSTRACT

A memory controller includes a control circuit configured to provide a control signal, an output interface unit, and a command storage unit coupled to the control circuit and the output interface. The command storage unit is configured to store a plurality of commands, receive the control signal, and provide, in response to the control signal, a selected command of the plurality of commands to the output interface unit.

30 Claims, 14 Drawing Sheets

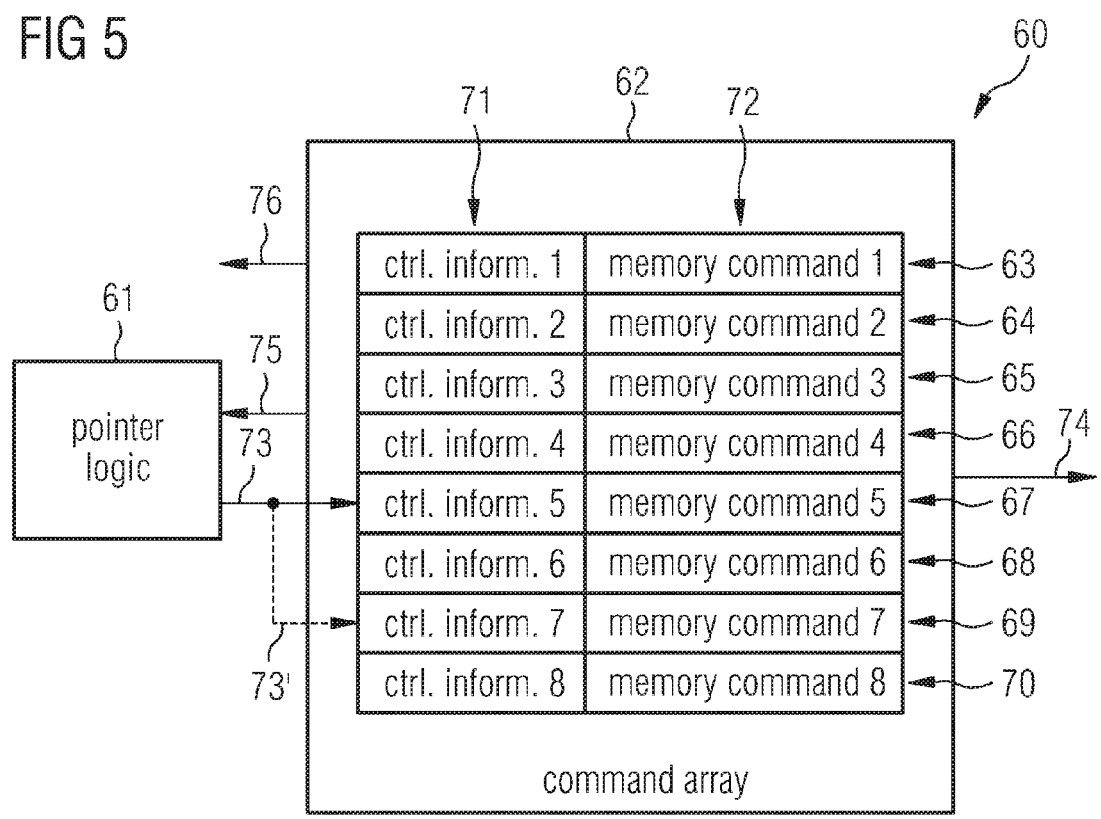

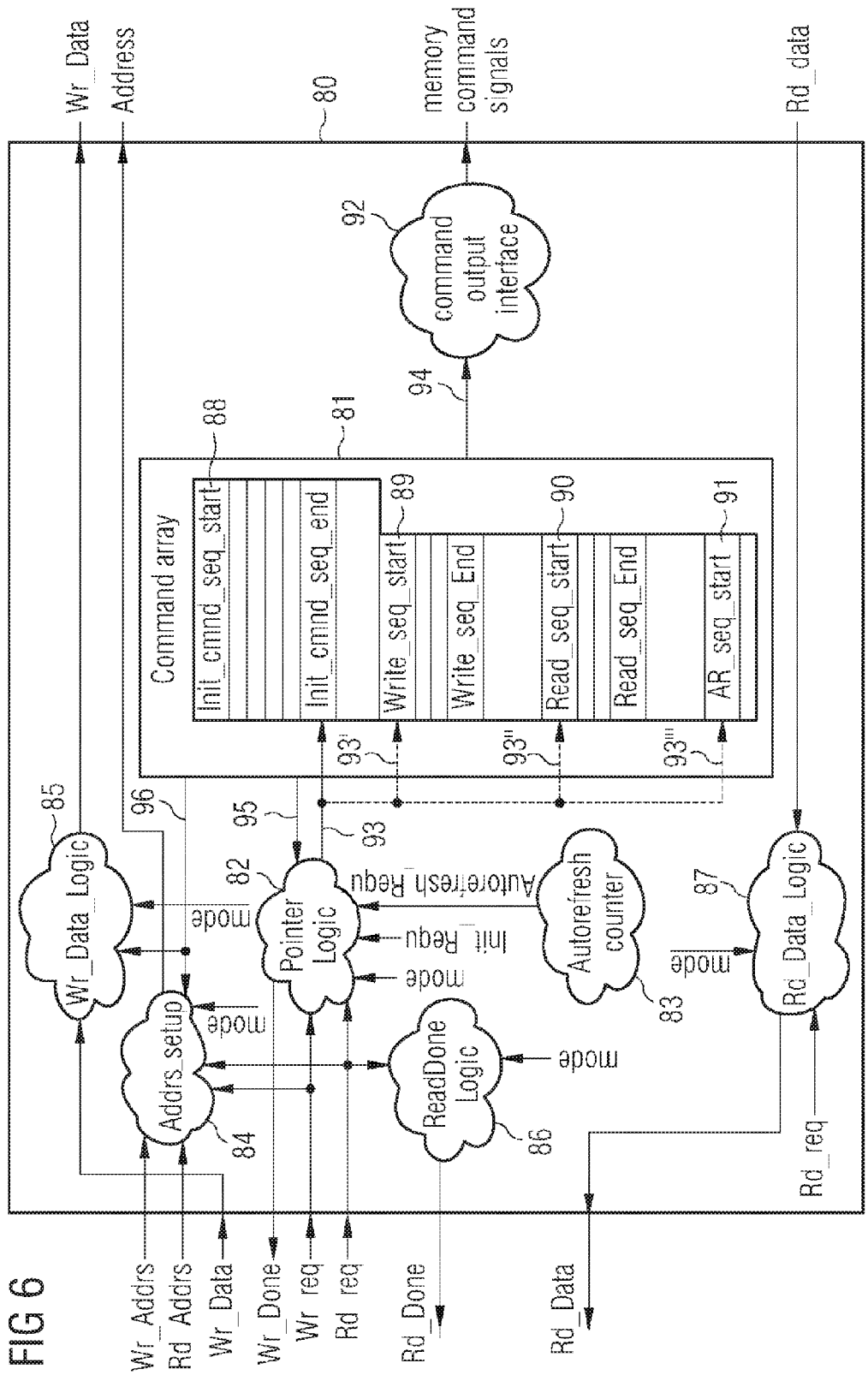

FIG 7A

| Field | Addrs | cke | A10 | bnk | cmndtype | cmd | delaycnt |
|---|---|---|---|---|---|---|---|
| Bits | 21:19 | 18 | 17 | 16:15 | 14:12 | 11:8 | 7:0 |

| Field | cke | A10 | bnk | cmndtype | cmnd | delaycnt |
|---|---|---|---|---|---|---|
| Bits | 18 | 17 | 16:15 | 14:12 | 11:8 | 7:0 |

| command register address | data<br>Addrs(9:7) :cke :A10 : bnk :cmndtype :cmd :delaycnt<br>21:19    : 18  :17  :16:15 :14:12    :11:8  :7:0 | |
|---|---|---|
| 0 | 000: 0:0:00:011:0111:11111111 | 121 |
| 1 | 000: 1:0:00:000:0111:01101010 | 122 |
| 2 | 000: 1:1:00:000:0010:00000101 | 123 |
| 3 | 000: 1:0:10:000:0000:00000010 | 124 |
| 4 | 000: 1:0:11:000:0000:00000010 | 125 |
| 5 | 000: 1:0:01:000:0000:00000010 | 126 |
| 6 | 010: 1:0:00:000:0000:11001000 | 127 |
| 7 | 000: 1:1:00:000:0010:00000101 | 128 |
| 8 | 000: 1:0:00:000:0001:00010011 | 129 |
| 9 | 000: 1:0:00:000:0001:00010011 | 130 |
| A | 111: 1:0:01:000:0000:00000010 | 131 |
| B | 000: 1:0:01:000:0000:00000010 | 132 |
| C | 000: 1:0:00:100:0000:00000010 | 133 |

| command register address | data<br>cke: A10 :bnk :cmndtype :cmnd :delaycnt<br>18 :17 :16:15 : 14:12 :11:8 :7:0 | |
|---|---|---|
| 20 | 1:0:00:000:0011:00000100 | ~141 |
| 21 | 1:0:00:000:0100:00000100 | ~142 |
| 22 | 1:1:00:101:0100:00001111 | ~143 |

| command register address | data<br>cke: A10 :bnk :cmndtype :cmnd :delaycnt<br>18 :17 :16:15 : 14:12 :11:8 :7:0 | |
|---|---|---|
| 20 | 1:0:00:000:0011:00000100 | ~151 |
| 21 | 1:0:00:000:0100:00000100 | ~152 |
| 22 | 1:0:00:001:0100:00000100 | ~153 |
| 23 | 1:0:00:010:0100:00000100 | ~154 |
| 24 | 1:1:00:111:0100:00001111 | ~155 |

MEMORY CONTROLLER AND METHOD OF CONTROLLING A MEMORY

BACKGROUND

Memory units typically comprise a memory and a memory control unit. A memory control unit typically includes a memory controller that sends various command sequences, such as an initialization command sequence, a write command sequence, a read command sequence, and an auto refresh command sequence to the memory in a predefined pattern. The memory controller can be implemented as a state machine, wherein different states of the state machine specify the command that is to be sent to the memory.

Such state machines for implementing a memory controller are typically implemented, at least to a significant portion, in hardware so that the sequence of commands that is applied to the memory is fixed. Conventionally, after device fabrication, changes in the command sequences are usually difficult or impossible to implement. Since command sequences may vary and since modifications in the command sequences may be difficult or impossible to implement using a conventional state machine implementation of the memory controller, it may be difficult to support different types of memories that employ different command sequences using a conventional state machine implementation. Still further, if different data widths are to be supported, the state machine becomes increasingly complex.

For these and other reasons there is a need for the present invention.

SUMMARY

One embodiment provides a memory controller. The memory controller includes a control circuit configured to provide a control signal, an output interface unit, and a command storage unit coupled to the control circuit and the output interface. The command storage unit is configured to store a plurality of commands, receive the control signal, and provide, in response to the control signal, a selected command of the plurality of commands to the output interface unit.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 5 illustrates one embodiment of an exemplary implementation of componentry of the memory controller of FIG. 4.

FIG. 6 is a block diagram illustrating a memory controller according to an embodiment.

FIGS. 7A and 7B illustrate an example format of data stored in a command array.

FIGS. 8, 9A-9B, 10A-10B, and 11 illustrate exemplary implementations of command sequences stored in a command array.

DETAILED DESCRIPTION

Figure 1:
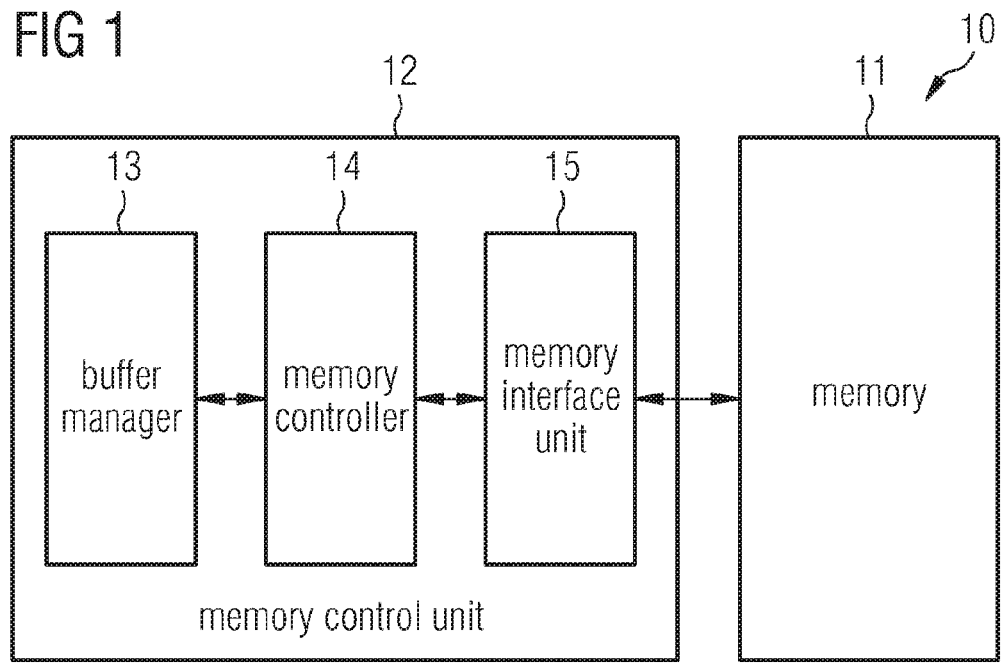
FIG. 1 is a block diagram illustrating one embodiment of a memory unit.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is also to be understood that, in the following description of exemplary embodiments, any direct connection or coupling between two functional blocks, devices, components or other physical or functional units illustrated in the drawings or described herein could also be implemented by an indirect connection or coupling.

Further, it is to be understood that the features of the various exemplary embodiments described herein may be combined with each other, unless specifically noted otherwise.

Embodiments relate to a memory controller and a method of controlling a memory. A memory controller embodiment comprises a command storage unit that has stored therein a plurality of commands. A method embodiment controls a memory in which a command is output from a command storage unit to the memory.

FIG. 1 is a block diagram illustrating one embodiment of a memory unit 10 comprising a memory 11 and a memory control unit 12. The memory control unit 12 comprises a buffer manager 13, a memory controller 14, and a memory interface unit 15. The buffer manager 13 performs functions such as the management of memory addresses at which data is to be stored in the memory. The buffer manager 13 provides write and read requests to the memory controller 14. The memory controller 14 handles the write and read request received from the buffer manager. In particular, the memory controller 14 has functions such as controlling a command sequence that is sent to the memory 11 and/or controlling the addresses that are to be sent out to the memory 11 depending on a mode of operation. The memory interface unit 15 handles specific operations that depend on the memory 11 that is used, such as a function of data conversion that depends on whether the interface is a double date rate (DDR) or single data rate (SDR) interface.

The memory controller may be configured as a chip or integrated circuit that is, for example, provided on motherboard or CPU of a computer.

The memory controller 14 sends various command sequences, such as an initialization command sequence, a write command sequence, a read command sequence and an auto refresh command sequence to the memory in a predefined pattern. The memory controller may be implemented as a state machine, different states of the state machine specifying the command that is to be sent to the memory.

Figure 2:
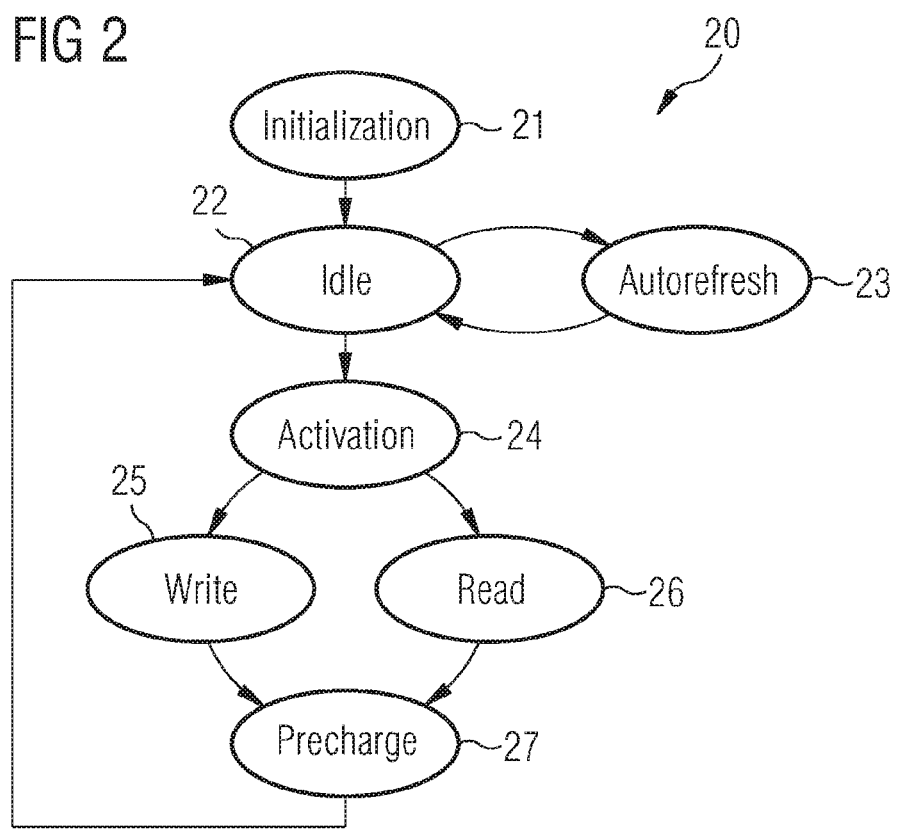
FIG. 2 is a diagram illustrating an example state machine implementation of a memory controller.

FIG. 2 is a diagram illustrating an example state machine implementation of a memory controller. In an initialization state 21, commands are sent to a memory for bringing up the memory and configuring memory control registers. In an idle state 22, no new commands are sent to the memory for a given time interval. As will be explained in more detail below, a given minimum idle time is usually employed between successive commands. In an auto refresh state 23, which is employed only for a dynamic memory, a command for refreshing data stored in the dynamic memory is output. When the memory controller receives a write or read request from the buffer manager, in an activation state 24, a command for opening or activation of a row is output, in a write state 25 or a read state 26, respectively, the data is written to or read from the memory, and in a precharge state 27 a command for closing or precharging the row is output. The state machine then returns to the idle state 23.

Figure 3:
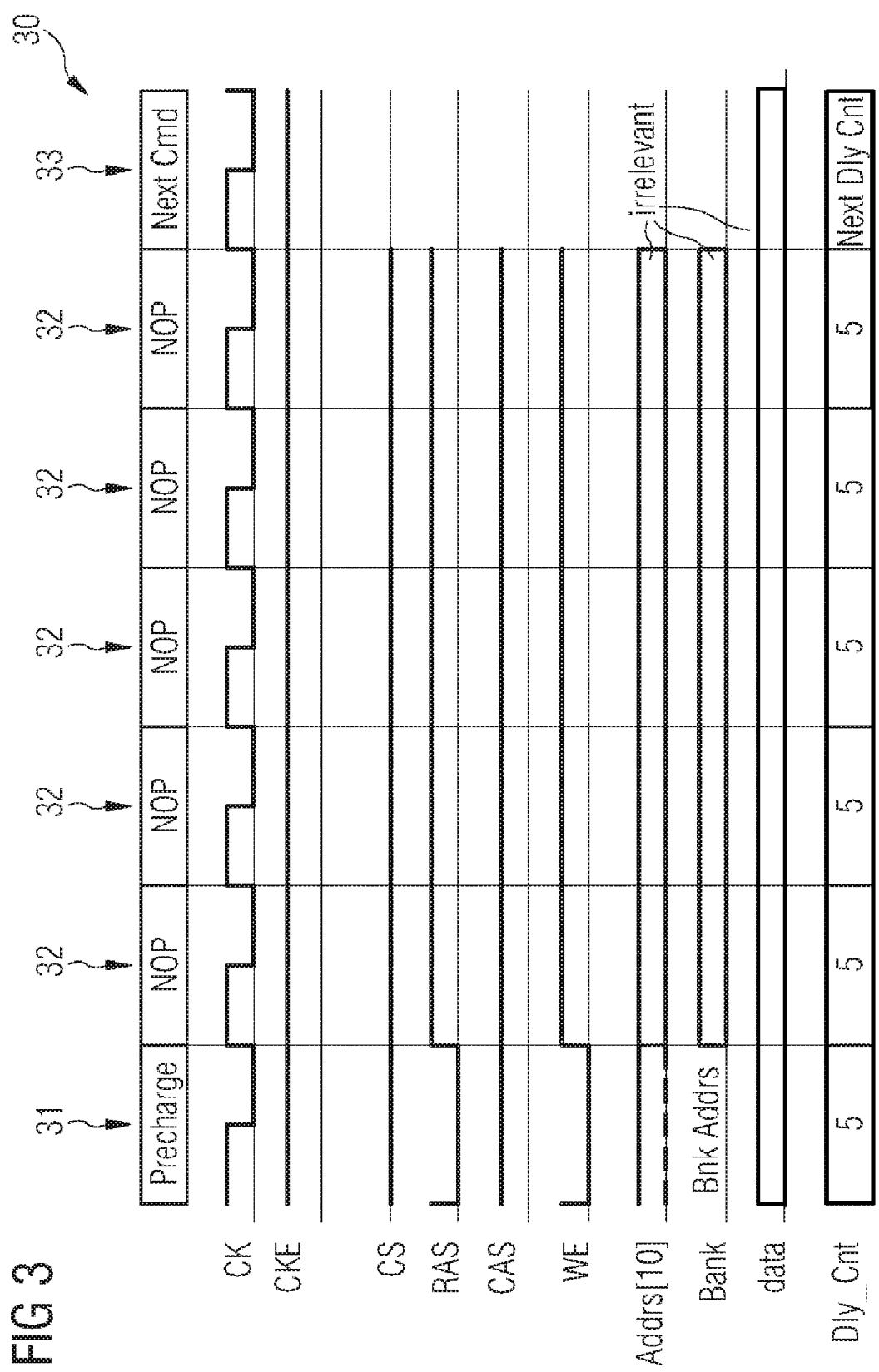
FIG. 3 is a diagram illustrating various example signals and corresponding commands provided to a memory.

FIG. 3 illustrates example signals and a corresponding example sequence of commands 30 provided to a memory. Commands 30 include a precharge command 31 followed by a number of No Operations (NOPs) 32, which in turn are followed by a next command 33. The signals are provided to the memory on different pins associated with the commands, and include a chip select (CS) signal, a row access strobe (RAS) signal, a column access strobe (CAS) signal and a write enable (WE) signal. In the precharge state 31, an address signal Addrs[10], that corresponds to the 10th bit of an address, is high when all banks are to be precharged and is low if only one of the banks is to be precharged, in which case the bank to be precharged is specified by a bank address signal. The delay between the precharge command 31 and the next command 33 is determined by the characteristics of the memory 11. The delay time is known in terms of a time that needs to be converted into a number of NOPs between the signals, represented by the delay count Dly_Cnt. The number of NOPs or the delay count will therefore be dependent on the memory controller clock frequency.

One embodiment of a memory controller comprises a command storage unit having stored therein a plurality of commands and a control circuit which is coupled to the command storage unit and provides a control signal thereto. The command storage unit outputs a command of the plurality of commands responsive to the control signal. In an embodiment, the command storage unit is programmable and the memory controller comprises a command programming interface unit coupled to the command storage unit, at least one command of the plurality of commands being stored in the command storage unit via the command programming interface unit. In an embodiment, the control signal comprises a pointer to data that is stored in the command storage unit. According to an embodiment, the command storage unit has further stored therein control information that is associated with the command output from the command storage unit, the control information being output to the control circuit.

One embodiment of a memory controller that comprises a programmable register unit, a control circuit, a first interface and a second interface. The register unit is coupled to the control circuit, the first interface, and the second interface. The register unit receives at least one command via the first interface and stores the at least one command, and the control circuit controls outputting of a command of the at least one command from the register unit to the second interface. In an embodiment, the command output from the register unit comprises at least one memory command signal for a memory. In an embodiment, the memory controller comprises a control input coupled to the control circuit, the control circuit having a plurality of operation modes, one of which is selected by a signal input via the control input.

One embodiment of a memory controller comprises a programmable first register unit, a control circuit, a first interface and a second interface, the first register unit being coupled to the control circuit, the first interface, and the second interface. The first register unit has stored therein at least one command received via the first interface, the control circuit controlling outputting of a command of the at least one command from the first register unit to the second interface. The first register unit further has stored therein control information associated with the command output from the first register unit. In an embodiment, the first register unit receives the control information via the first interface to store the control information, and outputs the control information to the control circuit when the command is output to the second interface. In an embodiment, the control information comprises delay count information.

One embodiment of a memory unit comprises a memory, a memory interface unit coupled to the memory and a memory controller coupled to the memory interface unit and comprising a programmable command storage unit that has stored therein a plurality of commands and a control circuit that is coupled to the command storage unit. The control circuit controls outputting of a command of the plurality of commands from the command storage unit to the memory interface unit.

A method of controlling a memory according to an embodiment comprises providing a memory controller coupled to the memory and having a command storage unit having stored therein a plurality of commands, retrieving a command of the plurality of commands from the command storage unit and outputting the command to the memory. In an embodiment, the command storage unit is programmable, and the method comprises storing at least one command of the plurality of commands in the command storage unit.

According to an embodiment, commands to be output to a memory are stored in a programmable command storage unit or register unit. This embodiment can provide enhanced versatility for the implementation of a memory controller, in particular in view of challenges such as supporting different DDR frequencies, supporting different memory interface data widths, or supporting memories that employ different command sequences.

Embodiments are described in more detail below with reference to the drawings.

Figure 4:
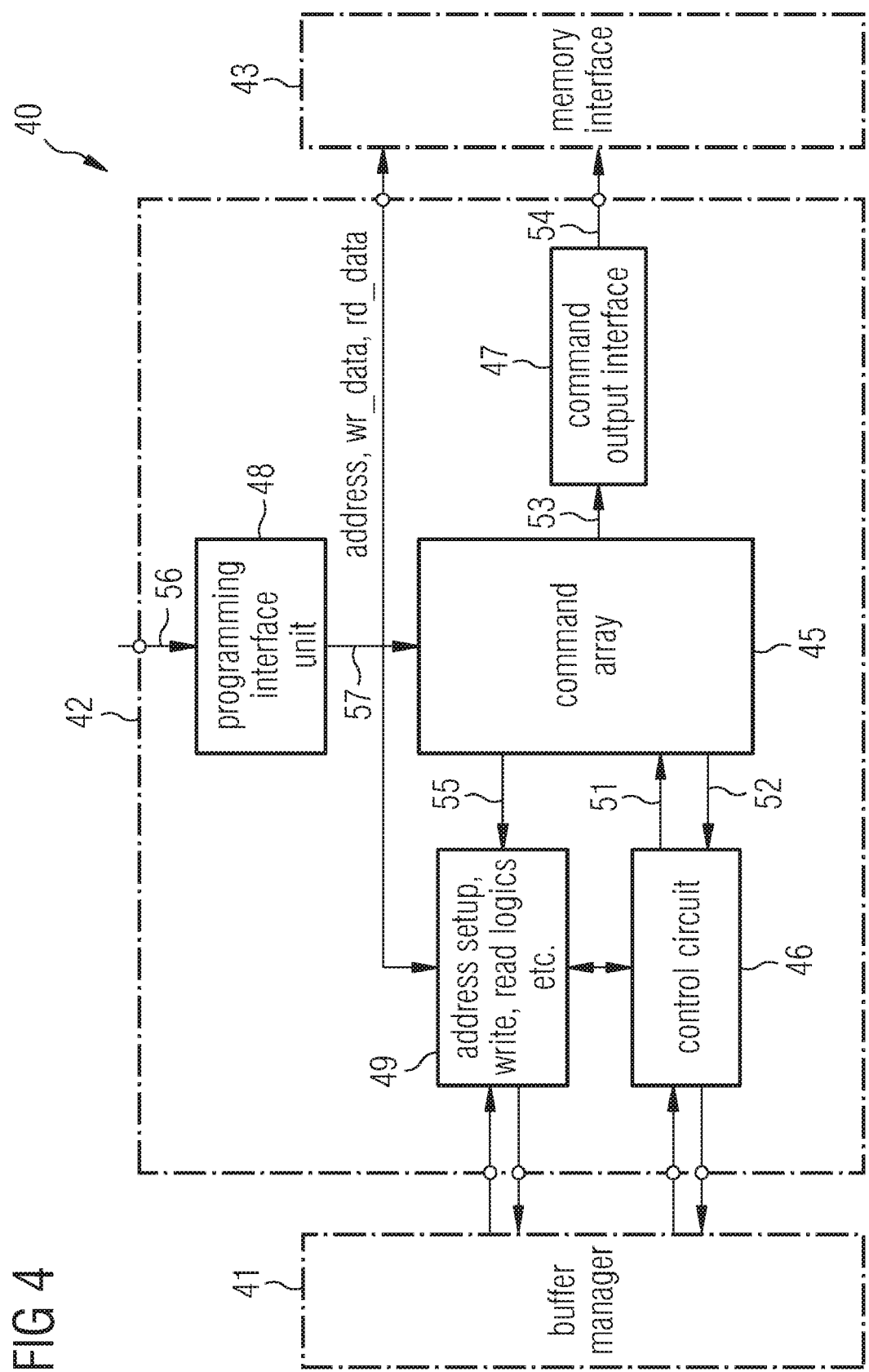
FIG. 4 is a block diagram illustrating a memory unit comprising a controller according to an embodiment.

FIG. 4 is a block diagram illustrating a memory controller 42 according to an exemplary embodiment which is comprised by a memory control unit 40. The memory control unit 40 further comprises a buffer manager 41 and a memory interface unit 43. The memory controller 42 comprises a command array 45, a control circuit 46, a command output interface 47, a programming interface unit 48, and additional memory controller circuitry 49. The circuitry 49 comprises, in an embodiment, one or several of an address setup logic, a write data logic, a read data logic, a read done logic, an auto refresh counter, and a mode register and/or extended mode registers. The command array 45 has stored therein a plurality of commands representing a command sequence. In an embodiment, a default set of commands is stored in the command array 45. Via programming interface unit 48, the default set of commands may be overwritten (i.e., other commands may be stored into the command array 45 by inputting data 56 into the memory controller 42) which data is provided to the command array 45 as signal 57. In the embodiment of FIG. 4, the command array 45 has further stored therein a control information associated with each of the commands stored in the command array 45. Similarly to the commands, default control information may initially be stored in the command array 45, while new control information may be stored by inputting the new control information via the programming interface unit 48.

Both the control circuit 46 and the circuitry 49 are coupled to the buffer manager 41 to receive requests and associated data therefrom and to provide signals or data thereto. In an embodiment, both the control circuit 46 and the circuitry 49 receive a write request signal and a read request signal indicative of whether a write or read operation is requested, while only the circuitry 49 receives addresses, such as write or read addresses, and write data. The circuitry 49 is further coupled to the memory interface unit 43 to provide addresses and write data thereto and to receive read data therefrom.

The command array 45 is coupled to the control circuit 46 to receive a control signal 51 therefrom and to provide control information 52 thereto. The command array 45 is further coupled to the command output interface 47 and the circuitry 49 to provide data, such as part of memory command signals and/or part of control information stored in the command array, thereto.

Next, exemplary operation of the memory controller 42 is described. The control circuit 46 generally has a function of controlling outputting of commands stored in the command array 45 to the command output interface 47. When the control circuit 46 determines that a write command sequence, a read command sequence or an auto refresh command sequence is to be output via the command output interface 47, based, for example, on a write request, a read request, or an auto refresh request received from the buffer manager 41 or the circuitry 49, respectively, the control circuit 46 inputs a control signal 51 into the command array 45. The control signal 51 specifies which of the commands stored in the command array 45 is to be output. Responsive to receiving the control signal 51, the command array 45 outputs the command specified by the control signal as a signal 53 to the command output interface 47. When the command is output from the command array 45, control information associated with the command and stored in the command array 45 is also output to the control circuit 46 as signal 52. Additionally or alternatively, part of the memory command or part of the control information may also be output to the circuitry 49 as signal 55.

The command output interface 47 receives the signal 53 from the command array 45 and may perform some additional signal conditioning to provide a signal 54 to the memory interface 43, the signal 54 provided to the memory interface comprising memory command signals for the memory. In another embodiment, no further signal conditioning is performed by the command output interface 47, and the signal 53 received from the command array 45 is directly output to the memory interface 43. In an embodiment, the command signal 53 that is output from the command array comprises at least the values for the signals CS, RAS, CAS, and WE. In another embodiment, the command signal that is sent to the memory interface further comprises a clock enable (CKE) signal.

The control circuit 46 receives the control information at 52 and generates a new control signal 51 that depends on the control information 52. In an embodiment, the control information 52 comprises a delay information that determines an idle time before the control circuit 46 generates a new control signal. In another embodiment, the control circuit 46 determines based on the control information 52 which command is to be output next from the command array 45 and generates a corresponding control signal 51.

In an embodiment, the data stored in the command array that is output to the circuitry 49 as signal 55 comprises address information for address setup. In an embodiment, the signal 55 comprises a tenth bit of an address and a bank address indicative of which banks are to be precharged in a precharge operation or which mode register or extended mode register is to be loaded (e.g., during initialization). In another embodiment, the signal 55 comprises address information for configuring mode registers.

FIG. 5 is a block diagram illustrating an exemplary implementation 60 of command array and control circuit componentry for the command array and control circuit of the embodiment of FIG. 4 or any other embodiment described herein. In the exemplary implementation, the control circuit is configured as or comprises a pointer logic 61. The command array 62 has stored therein a plurality of data sets 63-70, each comprising a memory command 72 that is output, partially or completely, as signal 74 to the command output interface. The data stored in the command array 62 further comprises a control information 71 associated with each one of the memory commands, which control information is output, completely or partially, to the pointer logic 61 when the corresponding memory command is output to the command output interface. In the exemplary implementation of FIG. 5, a pointer signal 73, 73' schematically illustrated as arrow in FIG. 5 is indicative of which of the data sets stored in the command array 62 is to be output. For example, for pointer 73, the memory command 5 is completely or partially output as signal 74 to the command output interface, while the control information 5 is completely or partially output to the pointer logic 61 as signal 75. Part of the control information 5 or the memory command 5 may also be output to other componentry of the memory controller, such as circuitry 49, as signal 76. Correspondingly, for pointer position 73', the memory command and corresponding control information comprised by the data set 69 are output from the command array.

The commands stored in the command array 62 may be comprised by one command sequence or a plurality of command sequences. In an embodiment, the command array 62 has stored therein an initialization command sequence for bringing up the memory and configuring the memory control registers, a write command sequence, a read command sequence and, in case the memory is a dynamic memory, an auto refresh command sequence. In an embodiment, the initialization command sequence comprises one or several NOPs, a precharge command, one or several mode register configuring commands, and one or several auto refresh commands. In an embodiment, the write command sequence comprises an activation command, one or several write commands, and a write with auto precharge command. In an embodiment, the read command sequence comprises an activation command, one or several read commands, and a read with auto precharge command. In an embodiment, the auto refresh command sequence comprises an auto refresh command.

FIG. 6 is a block diagram illustrating a memory controller 80 according to one embodiment. The memory controller 80 comprises a command array 81, a pointer logic 82, an auto refresh counter 83, an address setup logic 84, a write data logic 85, a read done logic 86, and a read data logic 87. The command array has stored therein different command sequences, such as an initialization command sequence 88, a write command sequence 89, a read command sequence 90, and an auto refresh command sequence 91, each comprising one or several commands. While not illustrated in FIG. 6, according to one embodiment, the memory controller 80 of FIG. 6 may also comprise a command programming interface for programming the various command sequences into the command array 81.

The pointer logic 82 and the address setup circuit 84 are respectively coupled to an input of the memory controller 80 to receive a write request and read request signal, respectively, from a buffer manager. An address from which data is to be read or to which data is to be written is output from the address setup circuit 84 to a memory interface unit. When the memory controller 80 receives a write request, the write data logic 85 receives data to be written from the buffer manager and provides the data to the memory interface unit. When the memory controller 80 receives a read request, the read data logic 87 receives data read from the memory and provides the data to the buffer manager. Upon completion of the read request, the read done logic outputs a read done signal to the buffer manager. The command array 81 is coupled to the pointer logic 82 to receive a control signal 93 therefrom and to provide control information 95 thereto. The command array 81 is further coupled to a command output interface 92 via which memory command signals stored in the command array 81 are output to the memory interface unit, and to the address setup logic 84 and the write data logic 85 to provide a signal 96 associated with the command that is output to the command output interface 92 thereto.

Next, exemplary operation of the memory controller 80 is described. Upon receiving an initialization request that may be generated by the memory controller or received, for example, from the buffer manager, an auto refresh request from the auto refresh counter 83, a write request or a read request from the buffer manager, the pointer logic 82 generates a control signal for inputting into the command array 81. The control signal may have the form of a pointer signal indicative of which of the data stored in the command array is to be output. Exemplary pointer positions are indicated at 93, 93', 93" and 93'" in FIG. 6. Responsive to the control signal, the command array 81 outputs the command associated with the present pointer position as signal 94 to the command output interface 92 which may perform some signal conditioning or may directly output the signal 94 as memory command signals to the memory interface unit. The command array 81 further outputs all or part of the control information associated with the present pointer position to the pointer logic 82 as signal 95. In an embodiment, the control information output to the pointer logic 82 comprises a delay count information specifying an idle time required before the pointer may be moved to the next command in a sequence or to a command in another sequence, and further comprises information indicative of whether the last command in a sequence has been reached. The pointer logic advances the pointer so that the respective commands are sent out in sequence, with the delays between the commands being specified by the delay count information which specifies the number of NOPs between successive commands. Once signal 95 indicates that the last command in a sequence has been reached, the pointer logic 82 does not further advance the pointer unless a new request, such as an autorefresh request, a write request or a read request is received.

Further, as also illustrated in FIG. 6, the pointer logic 82, the autorefresh counter 83, the address setup circuit 84, the read done logic 86, and the read data logic 87 respectively receive a mode signal indicative of one of a plurality of operation modes. In an embodiment, the operation of the respective memory controller componentry is modified in dependence on the selected mode. In an embodiment, the memory controller 80 supports different memory interface data widths, and the mode signal indicates which of the different data widths is selected. The command sequences stored in the command array 81 are then also modified in dependence on the mode selected.

Referring to FIGS. 7-11, exemplary data formats and exemplary data that may be stored in the command array 81 of the embodiment of FIG. 6, or in a command array of a memory controller according to one embodiment described herein, are explained next.

FIG. 7A indicates data fields comprised by data of an initialization sequence, while FIG. 7B indicates data fields comprised by the read, write, and auto refresh sequences. The data 100 comprised by the initialization sequence comprises a delay count field 101 that specifies a delay time between the present and next command in terms of a number of clock cycles. The command field 102 specifies the values for the signals CS, RAS, CAS, and WE that are output to the memory. The three-bit command type field 103 comprises information that is output to the pointer logic for the controller's internal use. The two-bit bank field 104 specifies address bits that will be used with a Load Mode Register Command to indicate a mode register that is to be written. The A10-field 105 represents a $10^{th}$ bit of an address that is sent along with a read, write, or autoprecharge command to indicate whether all banks are to be precharged. The CKE-field 106 stores the CKE signal to be sent out to the memory. The three-bit address field 107 stores additional address bits that are employed during the initialization sequence, for example, in loading or configuring the mode registers. The data 110 comprised by the write, read, or autorefresh command sequences comprises a delay count field 111, a command field 112, a command type field 113, a bank field 114, an A10-field 115, and a CKE-field 116, the information stored in which is essentially identical to the one of the corresponding fields explained with reference to FIG. 7A above.

For a given memory the data to be stored in the command fields 102, 112, the A10-fields 105, 115, and the CKE-fields 106, 116 is determined by the specification of the memory. For example, for the JEDEC DDR2 SDRAM specification, for an extended mode register set, CS, RAS, CAS, and WE are respectively low, and CKE is high. For auto refresh, CS, RAS, and CAS are low, WE is high, and CKE is high. For bank activation, CS and RAS are low, CAS and WE are high, and CKE is high. For write, CS is low, RAS is high, CAS and WE are low, CKE is high, and A10 is low for a write command without auto precharge, while A10 is high for a write command with auto precharge. For read, CS is low, RAS is high, CAS is low, WE is high, and CKE is high, A10 being low for a read command without auto precharge and being high for a read command with auto precharge. For a precharge command, CS and RAS are low, CAS is high, WE is low and CKE is high, A10 being high for a precharging of all banks and low for precharging of a single bank, in which case the bank values stored in the command array or a bank value received from the buffer manager specify the bank to be precharged. In a NOP, CS is low, RAS, CAS and WE are high and CKE is high.

While some of the exemplary data stored in the command array, such as the data in the command fields 102, 112, is determined by the specification of the memory, the data stored in the delay count field has to be determined in dependence on the operating parameters of the memory and memory controller, respectively. Since the delays are usually known in terms of time, the delay count will be determined in dependence on the operation frequency of the memory controller. The data stored in the command type fields 103, 113 will be selected in dependence on the specific implementation of the pointer logic or control circuit, respectively, comprised by the memory controller. For example, in an exemplary embodiment described in more detail below, bit 2 of the command type field specifies whether the respective command is the last command of a command sequence, so that the pointer logic may take appropriate action by pausing at the present pointer position until a new request is received, if the command is the last command in a sequence. Still further, as explained in more detail below, the control information that is output to the pointer logic may also direct the pointer logic to perform specific actions, such as accessing other registers having stored therein additional information.

FIGS. 8-11 illustrate exemplary data stored in various parts of the command array. For illustration purposes only, the example memory is assumed to be a DDR2-SDRAM memory. Further, it is assumed that the interface width of the buffer manager and the memory controller is 512 bits, and a burst length of 8 is used. Still further, the width of the memory interface is assumed to be programmable to 32 bits or 16 bits.

FIG. 8 represents data of an exemplary initialization command sequence section 120 stored in the command array which comprises data 121-133. For clarity reasons, the command register address is specified in hexadecimal notation. The initialization command sequence is started when an initialization enable command is received from the buffer manager. Subsequently, the commands corresponding to the data 121-133 are successively output. Here, and in FIGS. 9-11, the data in the command fields represent the values for CS, RAS, CAS, and WE, respectively. Data 121 represents a number of NOPs with CKE=0 which is usually associated with a long delay. In an embodiment such as illustrated in FIG. 8, the long delay is not directly stored in the command array, but is rather provided in a separate register. In data 121, CKE=0 in combination with the data 011 stored in the command type field signals the pointer logic to access the separate register for the delay count information. Data 122 corresponds to a number of NOPs with CKE=1. Data 123 correspond to a precharge all banks command, the delay of 5 in terms of clock cycles being determined by the idle time required between a precharging of all banks and the successive command. Data 124-127 corresponds to a load or set mode register command for extended mode registers (EMRs) 1-3 and for a mode register (MR), the data in the bank field specifying which of the mode registers is set. More particularly, data 124 corresponds to a load mode register for EMR2 command, data 125 corresponds to a load mode register for EMR3 command, data 126 corresponds to a load mode register for EMR1 command, and data 127 corresponds to a load mode registers for MR command for resetting the delay locked loop (DLL). While the set EMR1-3 commands that are reflected by data 124-126 employ, for the particular exemplary implementation illustrated, a delay count of 2 clocks each, the delay count for DLL reset is 200 clocks. Data 128 corresponds to a precharge all banks command, the delay of 5 clocks again being the delay employed between this command and the successive command. Data 129, 130 correspond to successive autorefresh commands, the delay associated with an autorefresh command and a successive command being 19 clocks in the example contemplated. Data 131 corresponds to a step at which a mode register is loaded for MR to initialize device operation (i.e., to program operating parameters without resetting the DLL), while data 132 corresponds to a command in which a mode register for EMR1 is loaded to execute Off Chip Driver (OCD) calibration, for example by setting default OCD values, while data 133 corresponds to a load mode register for EMR1 command for exiting the OCD setting.

FIGS. 9A and 9B illustrate exemplary data for the write command sequence stored in the command array, FIG. 9A representing the data for a 32-bit memory interface, while FIG. 9B represents the data for a 16-bit memory interface. Depending on whether the memory controller is operated for a 32-bit or 16-bit memory interface, either one of the data of FIG. 9A or 9B will be stored in the command array. The write command sequence 140 of FIG. 9A comprises data 141-143. Data 141 corresponds to an activate signal, the delay count of 4 being the number of clocks to be maintained between an activation command and a read or write from the same bank for an exemplary clock frequency. Data 142 corresponds to a write command, the delay count of 4 being the delay in number of clocks required between two consecutive bursts. Data 143 corresponds to a write with auto precharge command, as indicated by the A10-field having stored therein value 1, the delay between the write with auto precharge and the next command being 15 clocks in the example contemplated. It is to be noted that bit 2 of the command type field of data 143 is 1, signaling the pointer logic that the command is the last command in this sequence. The exemplary data 150 representing a write command sequence for the 16-bit memory interface, which comprises data 151-155, is similar to the command sequence 140 of FIG. 9A, the main difference being that four rather than two burst writes are employed. Data 151 corresponds to an activate command, while data 152, 153, and 154 corresponds to first, second and third writes. Data 155 corresponds to a write with auto precharge, the value 1 of bit 2 of the command type field again signaling that the command is the last command in the sequence. As may also be readily seen from the exemplary data 150 of FIG. 9B, bit 0 and bit 1 of the command type field indicate the number of the burst write that is presently performed. This information is therefore readily available to the pointer logic. While, for the exemplary embodiment of FIGS. 9A-9B, the values for the control signals CKE, CS, RAS, CAS, and WE are retrieved from the command array for outputting to the memory interface unit in a write command, the data, address and bank values used in the write command are received by the memory controller at the buffer manager interface and are provided to the memory interface unit.

Figure 10A:
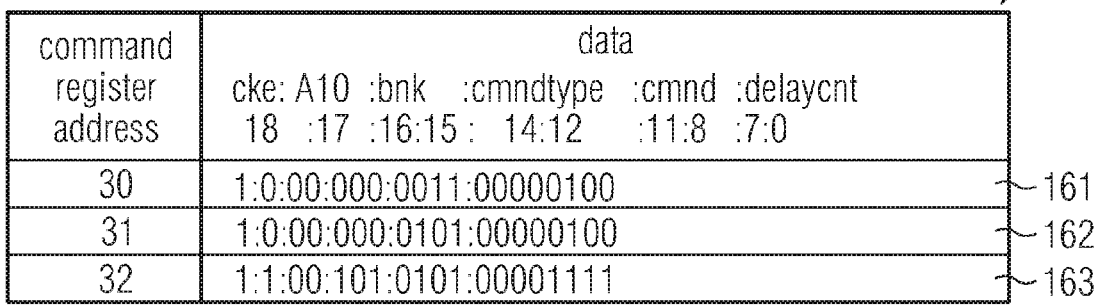
Figure 10B:
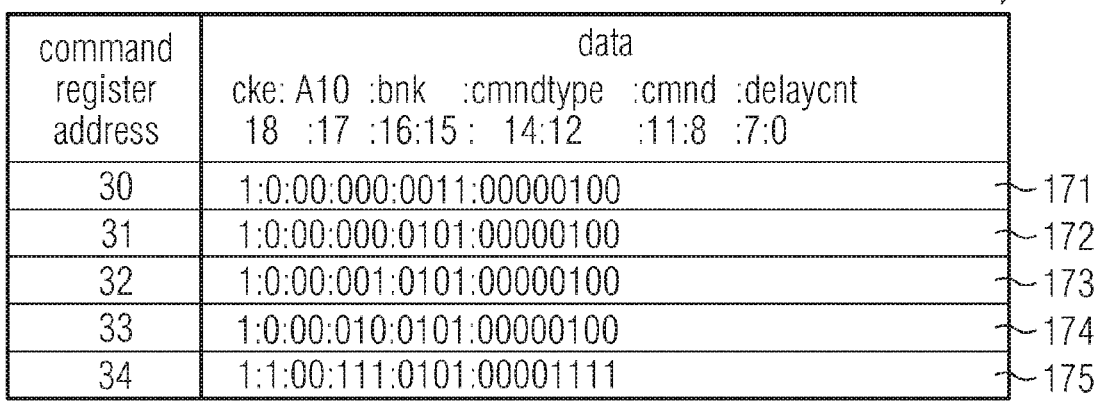

FIGS. 10A and 10B respectively illustrate exemplary data 160 for a read command sequence for a 32-bit memory interface and exemplary data 170 for a read command sequence for a 16-bit memory interface. Since the main difference between the data of FIGS. 10A and 10B and the data of FIGS. 9A-9B is the different entry in the command field for the read request as compared to the write request, a detailed discussion will be omitted for brevity.

Figure 11:
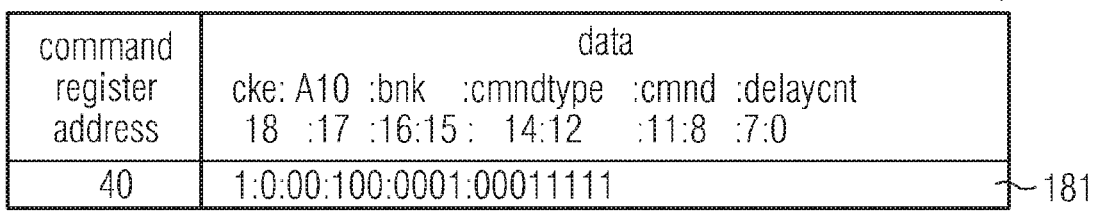

FIG. 11 illustrates exemplary data 180 that corresponds to an autorefresh command sequence which comprises data 181, corresponding to an autorefresh command. Again, note that bit 2 of the command-type-field has the value high, indicating that the command is the last command in the sequence. The delay of 31 clocks represents the delay required between an autoprecharge and the next command.

As has already been indicated with reference to FIGS. 7A and B above, the data for initialization employs three additional bits as compared to the data for write, read and autorefresh sequences. As indicated in FIG. 6, in an embodiment, the sections of the command array having stored therein data associated with the initialization sequence are therefore configured to have correspondingly larger capacity, thereby assisting resource optimization. In an alternative embodiment, the command array may have equal storage capacity for each command of the initialization command sequence and for each command of any other sequence.

While exemplary data formats and exemplary data stored in the command array has been explained with reference to FIGS. 7-11 above, it is to be understood that the data format of FIGS. 7A and B and the data of FIGS. 8-11 is only exemplary. It is understood that many modifications and variations of the data format and the data are conceivable. For example, in an embodiment, not all of CKE, CS, RAS, CAS and WE are stored in the command array. In another embodiment, the address bit A10 and the bank address bnk is not stored in the command array Many other modifications are conceivable, depending on the detailed implementation of the pointer logic or control circuitry of the memory controller. Further, it is also to be understood that the control information that is output from the command array to the pointer logic or other componentry of the memory controller may be suitably chosen as appropriate for the specific implementation of the pointer logic or other memory controller componentry. In particular, the control information may have more or less bits than schematically indicated in the exemplary embodiments explained above. In other embodiments, the command array can be extended in accordance with specific requirements. In an embodiment, the command array may include a separate section comprising commands for modifying the mode register or mode registers on the fly. A request for executing commands of this separate section to modify the mode registers may be initiated, for example, in that the memory controller receives a corresponding signal (e.g., from the logic that programs the memory controller) and in that the control circuit or pointer logic of the memory controller then controls outputting of commands of the separate section from the command array. In another embodiment, the write and/or read command sequences can include a load mode register command in the respective sequence in case the mode register or mode registers need to be specifically modified for the write and read commands.

Figure 12:
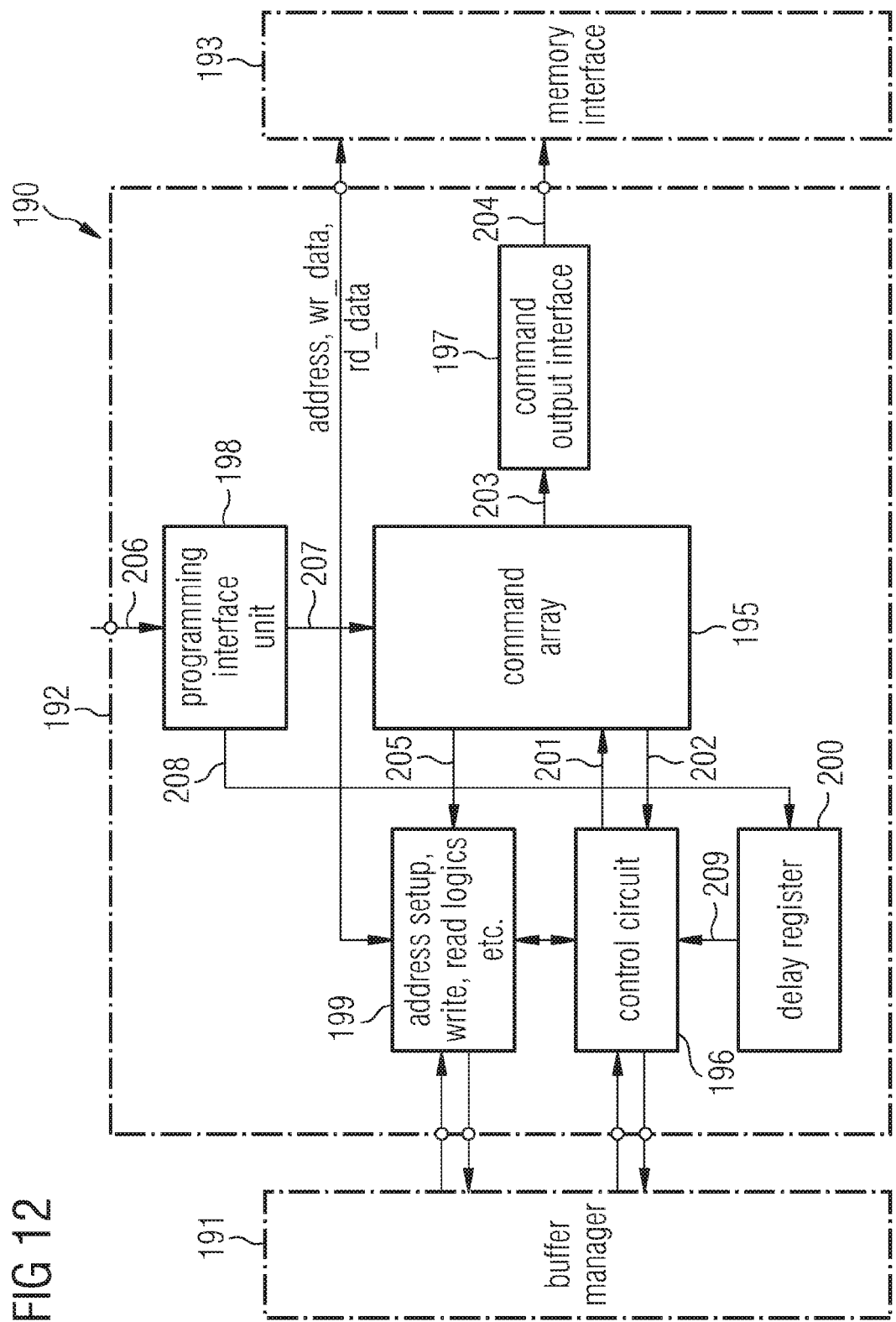
FIG. 12 is a block diagram illustrating a memory unit comprising a memory controller according to an embodiment.

FIG. 12 is a block diagram illustrating a memory controller 192 according to one embodiment, which is comprised by a memory control unit 190 which also comprises a buffer manager 191 and a memory interface 193. The memory controller 192 comprises a command array 195, a control circuit 196, a command output interface 197, a programming interface unit 198, and other memory controller circuitry 199. The configuration, operation, and coupling of these components can essentially correspond to the one of the corresponding components of any embodiment explained above. The memory controller 192 further comprises a delay register 200 that has stored therein a delay information which is accessed by the control circuit 196 in dependence on control information 202 output from the command array 195 to the control circuit 196. The delay register 200 is also coupled to the programming interface unit 198, so that data stored in the delay register 200 is programmable via the programming interface unit 198 that provides data 208 to the delay register 200. In another embodiment, separate programming interfaces are provided for programming the command array 195 and the delay register. In an embodiment, the delay register 200 has stored therein one delay value or a plurality of delay values that correspond to long delays between successive commands output to the memory interface 193. In an embodiment, the delay register 200 has stored therein delay values for all delays that exceed the maximum delay count number that can be stored in the command array. In an embodiment, the delay register has stored therein a delay value for a number of clock cycles between power on and enable of the CKE-signal.

An exemplary method 210 according to one embodiment performed by the control circuit 196 of the embodiment of FIG. 12 is explained next with reference to FIG. 13. First, at 211, the control circuit provides a control signal to the command array. Responsive thereto, at 212, the control circuit receives control information including a delay count from the command array. Based on the control information, at 213 the control circuit determines whether the delay register is to be accessed. If it is determined that the delay register is to be accessed, at 214 a delay value stored in the delay register is retrieved. Next, at 215, a wait parameter w representing a wait or idle time required before the next command is output is set equal to a delay value retrieved from the delay register. If at 213 the control circuit determines that the delay register does not need to be accessed, at 216 the parameter w is set equal to the delay count that has been previously received from the command array as part of the control information. At 217, the control circuit waits for w clock cycles before the next control signal is provided to the command array at 218.

Figure 13:
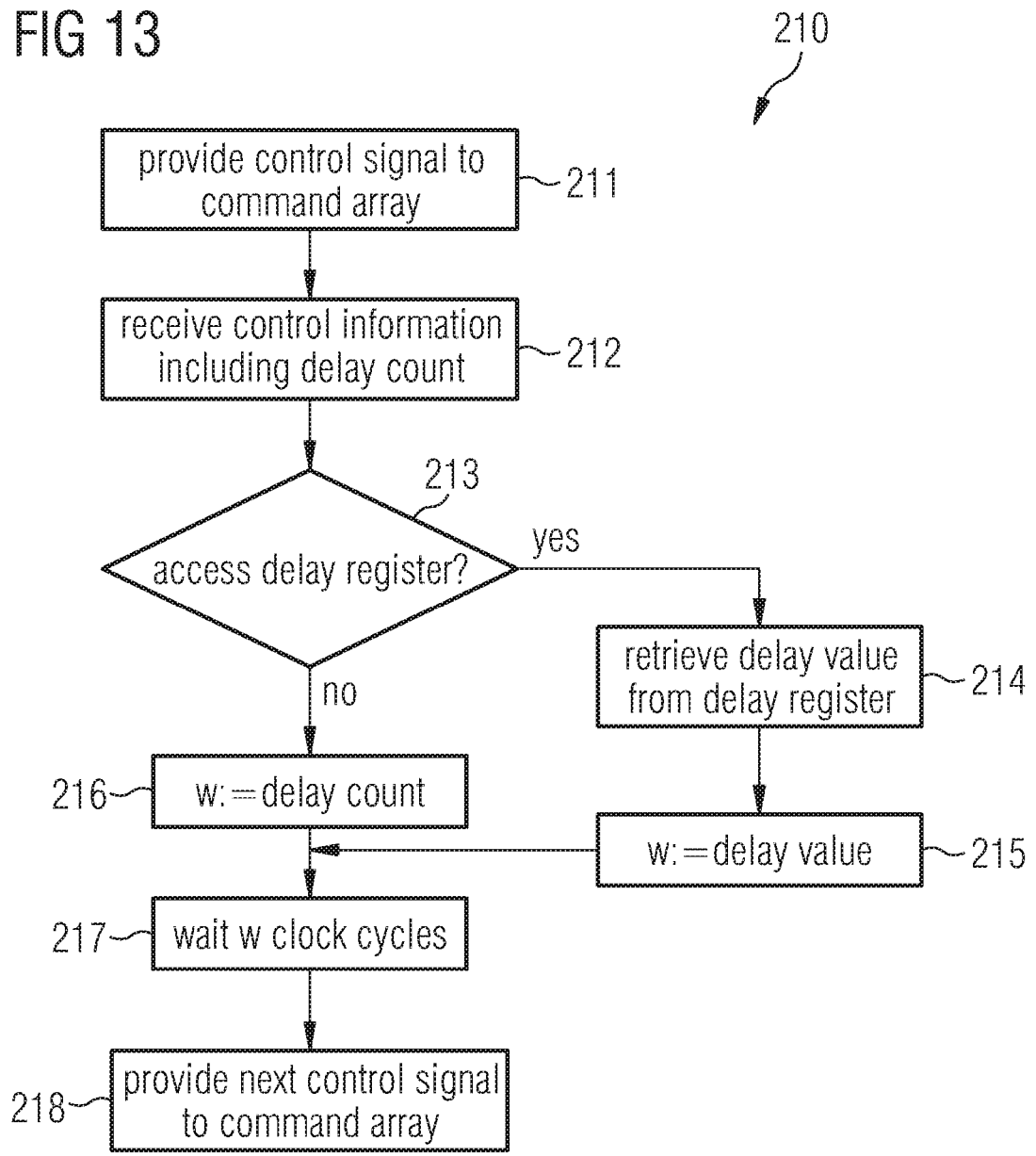
FIG. 13 is a flow diagram illustrating one embodiment of a method performed by the memory controller of FIG. 12.

In the embodiment of FIGS. 12 and 13, since a dedicated delay register 200 is provided, storage capacity requirements of the command array 195 do not need to be increased to accommodate single long delay times. Further, since the delay register 200 is also programmable via the programming interface unit 198, the memory controller 192 of the embodiment of FIG. 12 also can afford the enhanced versatility in supporting different operation modes of the memory controller and/or different memories that has been described for various embodiments above.

Figure 14:
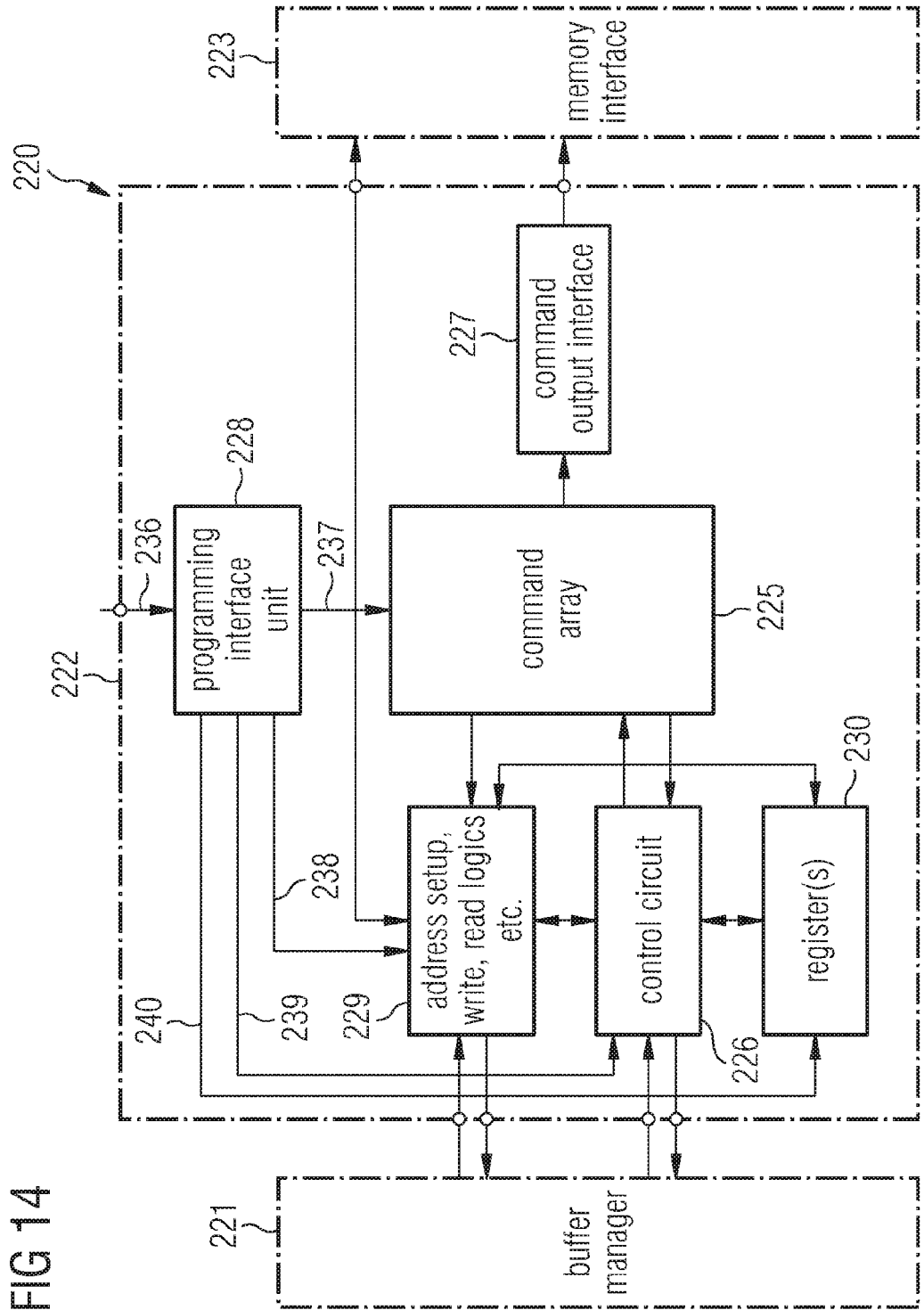
FIG. 14 is a block diagram illustrating a memory control unit comprising a memory controller according to an embodiment.

FIG. 14 is a schematic block diagram illustrating a memory controller 222 according one embodiment, which is comprised by a memory control unit 220 which also comprises a buffer manager 221 and a memory interface unit 222. The memory controller comprises a command array 225, a control circuit 226, a command output interface 227, and a programming interface unit 228, the configuration, operation and coupling of which essentially correspond to the one of the corresponding components described for any embodiment above. The memory controller 222 further comprises one register or several registers 230 having stored therein additional information on the operation of the control circuit 126 and/or the memory controller circuitry 229. The registers 230 are programmable via the programming interface unit 228. Further, as also indicated in FIG. 14, the circuitry 229 and the control circuit 226 may also be programmed or configured by inputting data via the programming interface unit 228. More specifically, data 236 input to the programming interface unit 228 may comprise data 237 for programming the command array 225, data 238 for programming the circuitry 229, data 239 for programming the control circuit 226 and data 240 for programming the registers 230. Any one of the data 238-240 may, for example, be a single signal specifying one of several operation modes, or may comprise more complex information, such as delay information or information to be stored in mode registers. Further, according to another embodiment, it is not required that all of the circuitry 229, the control circuit 226 and the registers 230 are programmable via the programming interface unit 228. Still further, if several of these components are programmable, programming may also be performed using different dedicated programming interfaces for the various components.

In any embodiment described above, the memory controller may include a look-ahead precharge-activate logic (i.e., the outputting of a command to the memory may be made dependent on the next command or on several next commands that are to be output to the memory).

An exemplary method 250 according to one embodiment performed by a memory controller including a look-ahead precharge-activate logic according to an embodiment is next explained with reference to the flow diagram of FIG. 15. First, at 251, a read or write operation or any other operation is performed. At 252, the row that is to be accessed in the next operation is determined. At 253, it is determined whether the row presently accessed and the row to be accessed in the next operation are identical. If the rows are not identical, at 254 the row is closed, which may include a precharging, after completion of the read or write operation, and a new row is activated for the next operation at 255. Subsequently, at 256, the next operation is performed. If, however, at 253 the rows accessed in the present and next operation are determined to be identical, the method directly proceeds to 256 (i.e., unnecessary closing and opening of the same row is avoided).

Figure 15:
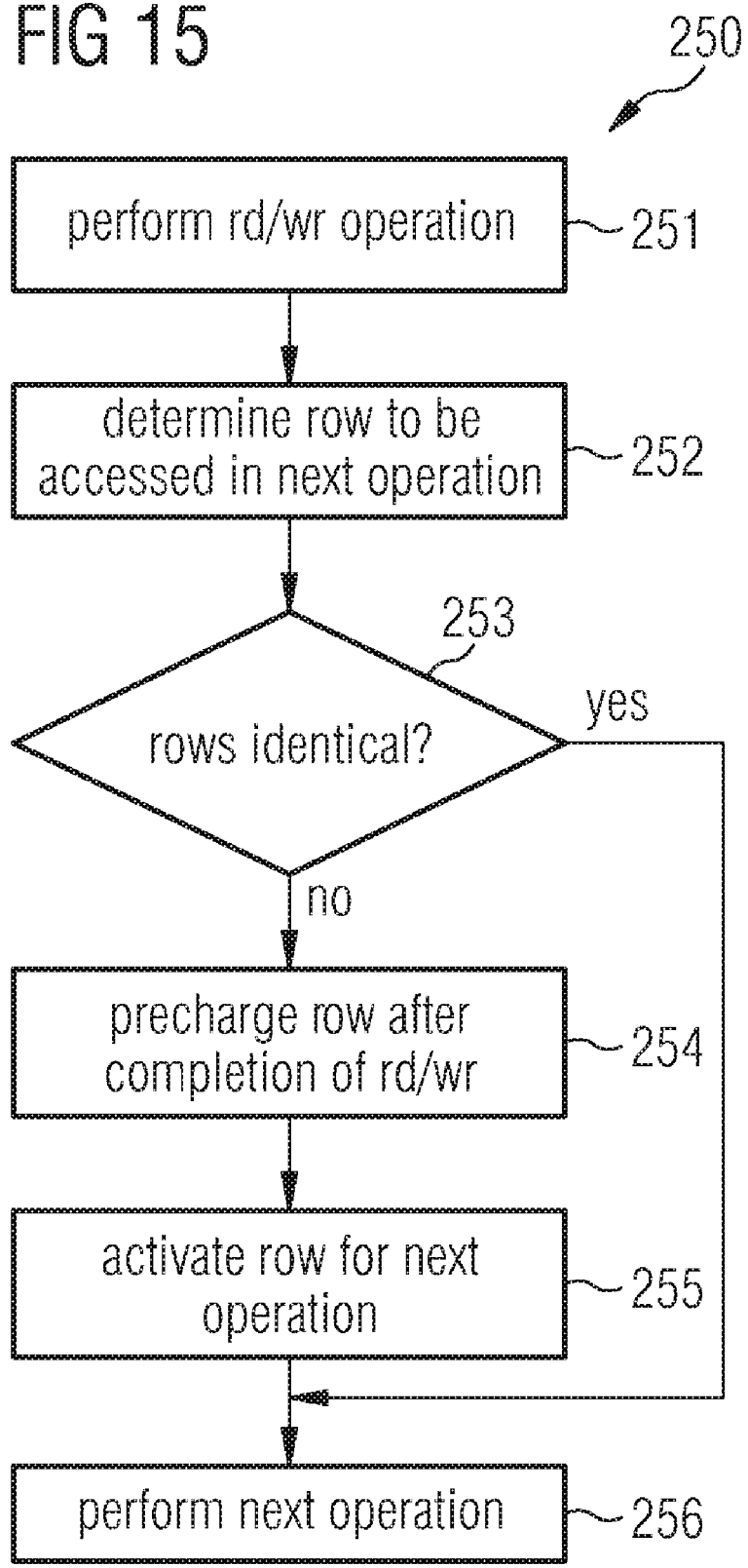
FIG. 15 is a flow diagram illustrating one embodiment of a method performed by a memory controller.

In an embodiment, the look-ahead precharge-activate logic and corresponding method explained with reference to FIG. 15 is implemented in the memory controller by supplementing the data stored in the command array as exemplarily explained with reference to FIGS. 9-11 above by additional last write or read operations that are not accompanied by an auto precharge. For example, referring to FIG. 9A, in addition to the data 140, data could be stored at command register address 23 which corresponds to a write command without autoprecharge with the correspondingly smaller delay count of 4 counts, and with bit 2 of the command type field being 1, indicating that the command is the last command in the sequence. If different rows are to be accessed in successive operations, the commands comprised by data 141, 142 and 143 are successively output to the memory. Thereafter, the pointer is reset to data 141 for the next write command. By contrast, if the memory controller determines that the same row is to be accessed in two successive write operations, the commands comprised by data 141 and 142 are successively output, whereafter the pointer is moved to the command stored in command register address 23 to perform another write operation without autoprecharge. Then the pointer returns to command register address 21 (i.e., data 142, to perform the first write for the next write operation). In this manner, unnecessary closing and opening the same row is avoided. It is to be understood that this embodiment is only exemplary, and that according to other embodiments the look-ahead precharge-activate logic may be implemented differently.

Figure 16:
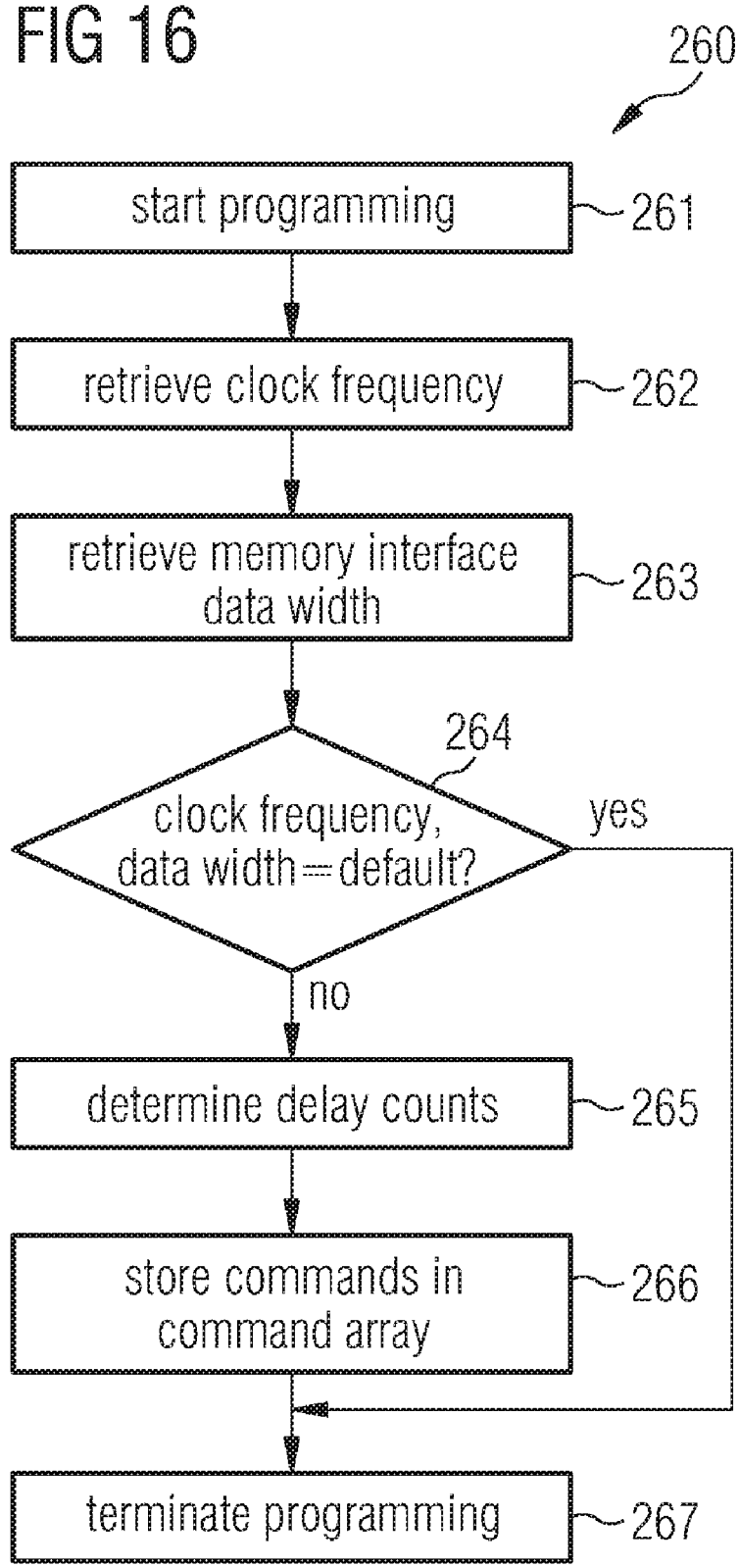
FIG. 16 is a flow diagram illustrating one embodiment of a method of programming a memory controller.

With reference to FIG. 16, an exemplary method embodiment of programming a command array comprised by a memory controller according to any of the exemplary embodiments of the invention is described next. For illustration purposes only, it is assumed that the memory controller is to accommodate different clock frequencies and different memory interface data widths, only. The command array has stored therein a set of default commands. First, at 261, programming is started. At 262 and 263, the clock frequency and the memory interface data width at which the memory controller is to be operated are retrieved. At 264, the clock frequency and the data width are compared to default values. If both the clock frequency and the data width correspond to default values, programming terminates at 267. In this case, no new commands need to be stored in the command array (i.e., the default commands stored in the command array may be used for operating the memory controller). Otherwise, at 265, the delay counts representing the delay between successive commands in terms of clock cycles are determined. At 266, the commands and the associated control information including the delay count are stored in the command array. It will be understood, for example, from the explanations given with reference to FIGS. 9 and 10 above, that the commands stored in the memory array will also be selected in dependence on the data widths of the memory interface.

It is to be understood that the present invention is not intended to be limited by the above described exemplary embodiments. Rather, many modifications and variations of the exemplary embodiments are conceivable within the scope of the invention as defined by the appended claims. For example, while the command array has been explained as being implemented in a register unit above, any other suitable memory may be employed. In an embodiment, the command array is implemented as a buffer.

Still further, while some of the embodiments above have been described with reference to a DDR memory, it is to be understood that the invention is not limited thereto. Rather, the present invention is equally applicable to any other memory, such as a single data rate (SDR) memory etc. In the latter case, the command array will be loaded with SDR-memory specific command sequences.

While the exemplary memory control units explained above respectively comprise one memory controller according to an embodiment, it is to be understood that a memory control unit may also comprise more than one memory controller according to an embodiment if there is more than one memory interface unit. In an embodiment, a separate memory controller may be provided for each memory interface unit. In another embodiment, the memory controllers may share componentry. In an embodiment, if more than one memory interface of the same kind is provided, the command array that may be implemented as a buffer or as a register may be shared among several memory controllers.

Figure 17:
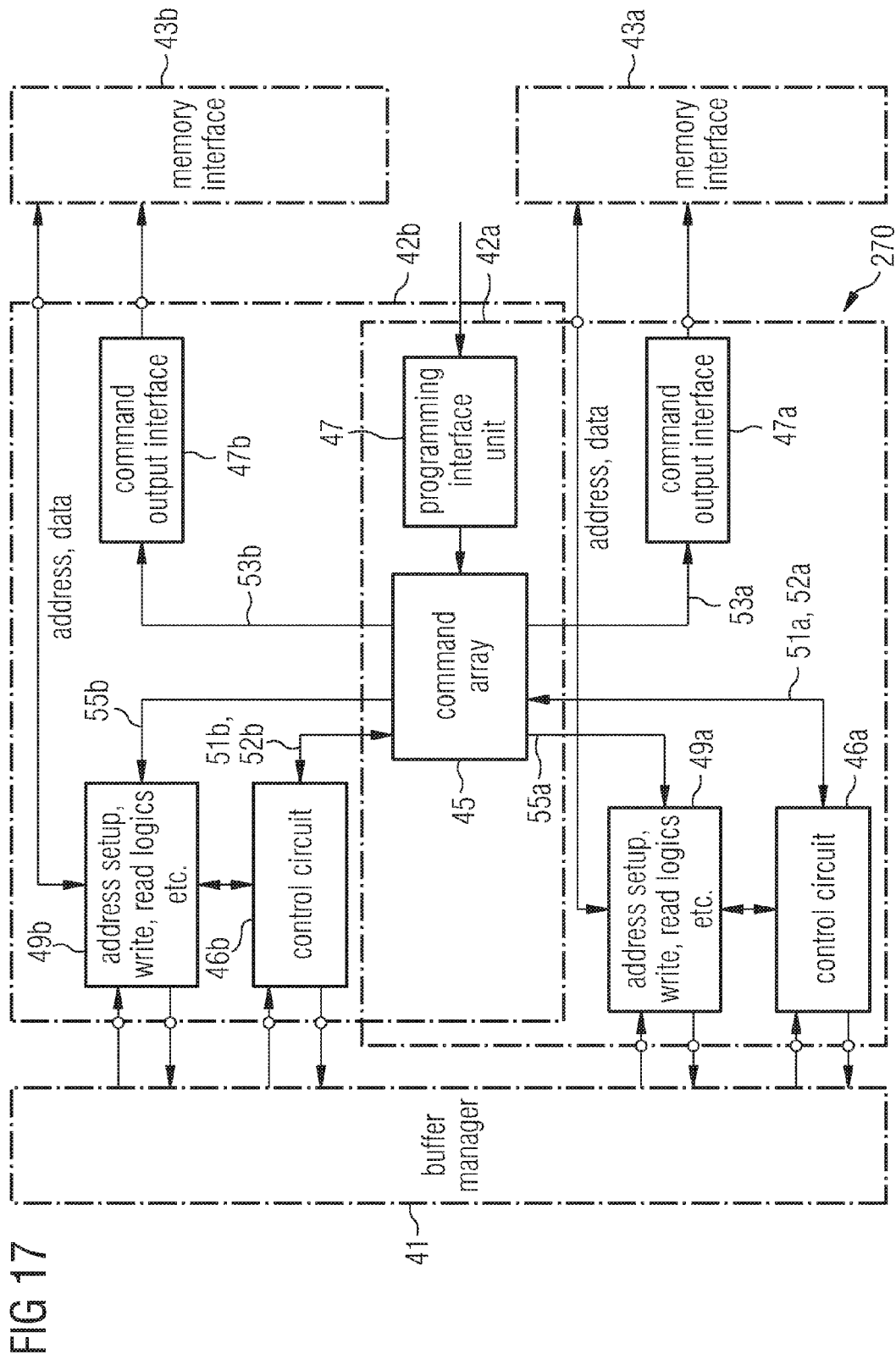
FIG. 17 is a block diagram illustrating a memory control unit according to an embodiment

FIG. 17 is a block diagram illustrating one embodiment of a memory control unit 270 that comprises the buffer manager 41, a first memory controller 42a and a first memory interface 43a as well as a second memory controller 42b and a second memory interface 43b. The first and second memory interfaces are of the same type (e.g., a DDR2 interface having a data width of 32 bit). The first memory controller comprises a control circuit 46a, a command output interface 47a coupled to the first memory interface 43a and additional memory controller circuitry 49a. The second memory controller comprises a control circuit 46b, a command output interface 47b coupled to the second memory interface 43b and additional memory controller circuitry 49b. Further, each of the memory controllers 42a, 42b comprises a command array 45 and a programming interface 47 (i.e., the command array 45 and the programming interface 47 is shared among the first memory controller 42a and the second memory controller 42b). The configuration, coupling and operation of each of the components of the memory controller 42a, 42b can correspond to the one of the respective components of the memory controller 42 explained with reference to FIG. 4 above. However, while, for example, separate control circuits are provided for each memory controller of the memory control unit 270 of FIG. 17, some of the componentry, in particular the command array and the programming interface unit, are shared among a plurality of memory controllers. It is to be understood that according to another embodiment, one or both of the memory controllers 42*a*, 42*b* of the memory control unit 270 of FIG. 17 may have a configuration according to any other embodiment described above. Further, while only two memory controllers 42*a*, 42*b* are illustrated in FIG. 17, in another embodiment, any arbitrary number of memory controllers larger than two may share a command array and a programming interface unit.

While data stored in the command array according to an exemplary embodiment has been described above, it is to be understood that according to various other embodiments the type of commands and/or the data associated with each command stored in the command array may be adapted to specific requirements associated with the respective implementation. For example, in an embodiment, the data stored in the command array may comprise a field representing a repeat count that indicates the number of times which the same command is to be repeated. In other embodiments, additional or alternative fields may be provided as appropriate.

The command array may be implemented as a register, as a buffer, or as any other suitable storage unit.

Further, it will be appreciated that, although specific functional blocks comprised by the memory controller according to various embodiments of the invention are illustrated in the drawings and explained above, the different functional blocks do not need to be implemented as separate physical units. Rather, two or several of the blocks can be intercombined with one another (e.g., in the form of a single integrated circuit). It should also be understood that any functional block illustrated in the drawings and explained above may comprise a plurality of sub-units or sub-blocks that may or may not be coupled with one another.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A memory controller configured to interface with a memory to control the memory, the memory controller comprising:
   a control circuit configured to provide a control signal;
   an output interface unit; and
   a programmable command storage unit coupled to the control circuit and the output interface and configured to store a plurality of commands, receive the control signal, and provide, in response to the control signal, a selected command of the plurality of commands to the output interface unit;
   wherein the output interface is configured to provide the selected command to the memory;
   wherein the programmable command storage unit is configured to store control information associated with the command and provide the control information to the control circuit;
   wherein the control circuit is configured to generate a new control signal based on the control information and to provide the new control signal to the programmable command storage unit to thereby cause the programmable command storage unit to output a new selected command to the output interface unit;
   wherein the control information comprises delay count information and the control circuit is configured to control a delay between selected commands output from the programmable command storage unit based on the delay count information.

2. The memory controller of claim 1, comprising:
   a command programming interface unit coupled to the programmable command storage unit, wherein at least one command of the plurality of commands is stored into the programmable command storage unit via the command programming interface unit.

3. The memory controller of claim 1, wherein the plurality of commands comprises at least one of an initialization command sequence, a write command sequence, a read command sequence, and an autorefresh command sequence.

4. The memory controller of claim 1, wherein the output interface unit is coupled to a memory interface and is configured to provide the selected command to the memory interface.

5. The memory controller of claim 1, wherein the selected command comprises at least one memory command signal for a memory interface.

6. The memory controller of claim 5, wherein the at least one memory command signal comprises at least one of a value for a chip select (CS) signal, a row access strobe (RAS) signal, a column access strobe (CAS) signal, a write enable (WE) signal, and a clock enable (CKE) signal associated with the command.

7. The memory controller of claim 1, wherein the selected command is selected from the plurality of commands based on the control signal.

8. The memory controller of claim 1, comprising:
   at least one input configured to receive a write request or a read request; and
   wherein the control circuit is coupled to the input and is configured to provide the control signal to the programmable command storage unit responsive to the write request or the read request.

9. The memory controller of claim 1, wherein the memory controller is configured as an integrated circuit.

10. A memory controller configured to interface with a memory to control the memory, the memory controller comprising:
    a first interface;
    a second interface;
    a programmable register unit coupled to the first interface and the second interface and configured to receive at least one command via the first interface and store the at least one command; and
    a control circuit coupled to the programmable register unit and configured to control outputting of a selected command from the programmable register unit to the second interface;
    wherein the second interface is configured to provide the selected command to the memory;
    wherein the programmable register unit is configured to store control information associated with the command and provide the control information to the control circuit;
    wherein the control circuit is configured to generate a new control signal based on the control information and to provide the new control signal to the programmable register unit to thereby cause the programmable register unit to output a new selected command to the second interface;
    wherein the control information comprises delay count information and the control circuit is configured to control a delay between selected commands output from the programmable register unit based on the delay count information.

11. The memory controller of claim 10, wherein the programmable register unit is configured to store at least one command sequence received via the first interface.

12. The memory controller of claim 10, wherein the selected command output from the programmable register unit comprises at least one memory command signal for a memory.

13. The memory controller of claim 10, comprising:
a control input coupled to the control circuit; and
wherein the control circuit has a plurality of operation modes, wherein a selected operation mode of the plurality of operation modes is selected by a signal received at the control input.

14. The memory controller of claim 10, comprising:
a third interface coupled to the control circuit; and
wherein the control circuit is configured to receive at least one of a write request, a read request, an initialization request, and an autorefresh request for a memory at the third interface and control outputting of the selected command from the programmable register unit based on the request.

15. The memory controller of claim 14, wherein the control circuit is configured to receive the request and a successive request at the third interface and control outputting of the selected command from the programmable register unit based on both the request and the successive request.

16. A memory controller configured to interface with a memory to control the memory, the memory controller comprising:
a first interface;
a second interface;
a programmable first register unit coupled to the first interface and the second interface and configured to store at least one command received via the first interface; and
a control circuit coupled to the first register unit and configured to control outputting of a selected command of the at least one command from the first register unit to the second interface; and
wherein the programmable first register unit is configured to store control information associated with the command output from the programmable first register unit;
wherein the second interface is configured to provide the selected command to the memory;
wherein the programmable first register unit is configured to provide the control information to the control circuit when the selected command is output to the second interface;
wherein the control information associated with the command which is being output is provided to the control circuit;
wherein the outputting of a subsequent new command from the programmable first register unit is controlled by the control circuit based on the control information received from the programmable first register unit;
wherein the control information comprises delay count information and the control circuit is configured to control a delay between commands output from the programmable first register unit based on the delay count information.

17. The memory controller of claim 16, wherein the programmable first register unit is configured to receive the control information via the first interface and store the control information.

18. The memory controller of claim 16, comprising:
a second register unit coupled to the control circuit and configured to store second control information; and
wherein the control circuit is configured to retrieve the second control information from the second register unit in response to and based on the control information.

19. The memory controller of claim 18, wherein the second control information comprises at least one of an autorefresh count, an operation mode information, and a delay count information.

20. The memory controller of claim 16, wherein the control information comprises repeat count information.

21. The memory controller of claim 20, wherein the control circuit is configured to control repeated outputting of the selected command based on the repeat count information.

22. A memory unit, comprising:
a memory;
a memory interface unit coupled to the memory; and
a memory controller coupled to the memory interface unit and comprising:
programmable means for storing a plurality of commands; and
means for providing a control signal to control outputting of a command from the means for storing a plurality of commands to the memory interface unit;
wherein the programmable means includes means for storing control information associated with the command and means for providing the control information to the means for controlling;
wherein the means for providing the control signal includes means for generating a new control signal based on the control information and means for providing the new control signal to the programmable means to cause the programmable means to output a new selected command;
wherein the control information comprises delay count information and the means for controlling controls a delay between commands output from the programmable means based on the delay count information.

23. The memory unit of claim 22, comprising:
a buffer manager coupled to the memory controller to provide a write request or read request to the memory controller, wherein the means for controlling outputting of a command controls outputting of the command in response to the write request or the read request.

24. The memory unit of claim 22, comprising:
a further memory interface unit; and
a further memory controller coupled to the further memory interface unit and comprising the means for storing a plurality of commands.

25. The memory unit of claim 24, wherein the further memory controller comprises a further means for controlling outputting of a command from the means for storing a plurality of commands to the further memory interface unit.

26. A method of controlling a memory, comprising:
providing a memory controller coupled to the memory and comprising a programmable command storage unit having stored therein a plurality of commands;
retrieving a command of the plurality of commands from the programmable command storage unit;
outputting the command from the memory controller to the memory;
storing control information associated with the command in the programmable command storage unit, wherein the control information comprises delay count information;
providing the control information associated with the command which is being output to a control circuit;

outputting a subsequent new command from the programmable command storage unit under control of the control circuit based on the control information received from the programmable command storage unit; and controlling a delay between commands output from the programmable command storage unit based on the delay count information.

27. The method of claim 26, comprising:

storing at least one command of the plurality of commands in the programmable command storage unit.

28. The method of claim 26, comprising:

selecting an operation mode for the memory, wherein the control information is stored in the programmable command storage unit based on the operation mode.

29. The method of claim 26, wherein the command comprises at least one of a value for a chip select (CS) signal, a row access strobe (RAS) signal, a column access strobe (CAS) signal, a write enable (WE) signal, and a clock enable (CKE) signal associated with the command.

30. A method of controlling a memory, comprising:

providing a memory controller separate from the memory having a plurality of operation modes and comprising a programmable register unit wherein the memory controller has a plurality of operation modes which are associated with a plurality of different memories or memory interfaces;

selecting an operation mode for the memory controller from the plurality of operation modes based on the memory which is to be controlled;

storing a plurality of commands in the programmable register unit based on the selected operation mode;

storing control information associated with a first command in the programmable register unit, wherein the control information comprises delay count information;

outputting the first command from the programmable register unit to the memory;

providing the control information to a control circuit;

outputting a second command from the programmable register unit under control of the control circuit based on the control information received from the programmable register unit; and controlling a delay between commands output from the programmable register unit based on the delay count information.

* * * * *